3,305,592
SEPARATION OF ALKANOLS FROM HYDROCARBONS USING BENZYL ALCOHOL, DIMETHYLFORMAMIDE, FURFURYL ALCOHOL, FURFURAL AND MIXTURES THEREOF
Jerry A. Acciarri and Eugene F. Kennedy, Ponca City, Okla., assignors to Continental Oil Company, Ponca City, Okla., a corporation of Delaware
No Drawing. Filed Jan. 17, 1964, Ser. No. 338,322
9 Claims. (Cl. 260—643)

This invention relates to the separation of normal primary alkanols from admixtures thereof with hydrocarbons having comparable volatility characteristics. More particularly, the present invention relates to the liquid-liquid extraction of normal primary alcohols from mixtures thereof with $\alpha$-olefins and/or normal paraffins where such mixtures exhibit a substantially common boiling point range.

Process streams are frequently encountered which contain mixtures of $\alpha$-olefinic and/or normal paraffinic hydrocarbons with normal primary alcohols. Separation of these materials is difficult when their boiling points are close to each other and is particularly difficult in the case of the relatively high molecular weight, water-immiscible species of these compounds. Many solvents which may be employed to extract lower molecular weight, normal primary alcohols from normal paraffinic hydrocarbons, or to extract such lower alcohols from $\alpha$-olefins of comparable molecular weight cannot be used effectively in separating the higher homologues of these respective compounds from each other.

It is known to those skilled in the art that both the lower $\alpha$-olefins and lower normal primary alcohols demonstrate a different solubility preference for polar solvents; however, in the case of the higher molecular weight homologues of these compounds, the length of the carbon chain attached to the olefinic and alcohol functional group decreases the significance of the difference in the degree of solubility in polar solvents observed for the lower $\alpha$-olefins and normal primary alcohols. Solvent fractionation of mixtures of the higher molecular weight $\alpha$-olefins and normal primary alcohols therefore is not so easily accomplished as with mixtures of the lower molecular weight homologues of these compounds. The same is true with respect to prior efforts to separate the higher molecular weight, water-immiscible, normal primary alcohols from the relatively nonpolar paraffin hydrocarbons of higher molecular weight.

The present invention provides a method for separating normal primary alkanols from mixtures thereof with $\alpha$-olefins and/or normal paraffin hydrocarbons of approximately the same boiling point as such alcohols irrespective of the molecular weight of the components of such mixtures. The invention is based upon the discovery that certain highly polar, oxygen-containing compounds having a relatively compact or condensed molecular structure and generally having substantially different boiling points from the materials to be subjected to the extraction, demonstrate selectivity as between such normal primary alcohols and $\alpha$-olefins and normal paraffinic hydrocarbons in the same general molecular weight range. The extraction agents which have been found effective and which are employed in the practice of the present invention are furfural, benzyl alcohol, dimethylformamide and furfuryl alcohol.

The invention has been found to be particularly useful in the purification of an $\alpha$-olefin product stream commercially produced by a displacement reaction in which aluminum trialkyl compounds of relatively high molecular weight (alkyl substituents containing an average of about 8 or more carbon atoms) are subjected to contact with ethylene in the presence of a nickel catalyst at high pressures or, alternately, are contacted with ethylene at a temperature of about 500° F. and a partial pressure of from 300 to 400 pounds per square inch.

When producing high molecular weight $\alpha$-olefins in the described manner, there are several alternate ways of recovering the desired $\alpha$-olefins from the displacement reaction mixture. In one of these recovery techniques, alcohol contamination is unavoidable; and in the others, such contamination can be encountered. Heretofore, it has been very difficult to remove contaminant amounts of alcohols from $\alpha$-olefin products. Now, in accordance with the present invention, this can be readily achieved.

It is an object of the present invention to provide a method for removing dissolved, water-immiscible, normal primary alcohols from mixtures thereof with $\alpha$-olefins and/or normal paraffinic hydrocarbons of substantially the same boiling point.

Another object of the present invention is to provide a process for preparing either $\alpha$-olefins or linear primary alcohols of high purity from a high molecular weight, aluminum trialkyl starting material.

A still further object of the invention is to provide a method for essentially completely purifying higher $\alpha$-olefins obtained by a displacement reaction in which a higher trialkylaluminum compound is either thermally or catalytically reacted with ethylene.

An additional object of the invention is to provide certain oxygen-containing, highly polar organic solvents for use in the selective extraction of normal primary alcohols from $\alpha$-olefins and/or normal paraffinic hydrocarbon compounds.

Other objects and advantages of the invention will be apparent from the detailed description of the invention and examples which follow.

Illustrative of normal primary alcohols which can be extracted from mixtures thereof with $\alpha$-olefins and/or normal paraffins of comparable volatility characteristics in accordance with this invention include ethanol, 1-propanol, 1-butanol, 1-pentanol, 1-hexanol, and especially the higher alkanols, such as 1-octanol, 1-nonanol, 1-decanol, 1-dodecanol, 1-tridecanol, 1-tetradecanol, 1-pentadecanol, cetyl alcohol, 1-octadecanol, 1-eicosanol, 1-pentacosanol, 2-heptacosanol, 1-triacontanol, 1-tritriacontanol, and the like. Because of the difficulty heretofore experienced in separating high molecular weight, water-immiscible normal primary alcohols from normal paraffin hydrocarbons and/or $\alpha$-olefins of comparable molecular weight (of from about 8 to about 40 carbon atoms) and boiling points sufficiently close to the alcohols to render separation by distillation difficult or impractical, the invention finds its most useful and preferred application in the extraction of water-immiscible, oil soluble alcohols from such higher boiling $\alpha$-olefinic and paraffinic hydrocarbons.

As hereinbefore indicated, the extraction agents of the present invention include benzyl alcohol, dimethylformamide, furfuryl alcohol, furfural, and mixtures thereof. In the extraction of the alcohols from $\alpha$-olefins and/or normal paraffin hydrocarbons employing these solvents, the extract phase which is developed is rich in the extracted alcohols; and the raffinate phase retains the predominance o the $\alpha$-olefins and normal paraffinic hydrocarbons. A substantial portion of the alcohols present in the mixture subjected to extraction are removed therefrom with one or two extractions in the case of most of the enumerated solvents.

In general, a liquid-liquid extraction using the solvents of the present invention to extract normal primary alcohols can be carried out at a temperature of between about −30° C. and 200° C., preferably at a temperature of between about −20° C. and 50° C. The extraction generally proceeds well at ambient room temperatures although the temperature conditions selected for any given extraction will depend upon the particular charging stock employed, the solvent/feed ratio, the number of extraction stages utilized, the degree of extraction which is sought, the proportions of auxiliary solvents or countersolvents (if any), etc. The pressure employed in the extraction is not critical, and extraction at atmospheric pressure is therefore preferred. The only requirement relating to the pressure conditions observed is that the system be maintained in the liquid phase.

The ratio of solvent to the charge mixture of α-olefins and/or normal paraffinic hydrocarbons with the alcohols to be extracted must be sufficient to exceed the solubility of the solvent in the charge stock in order to form two distinct liquid phases, viz., a raffinate phase of α-olefins and/or paraffin hydrocarbons containing a relatively small amount of solvent and an immiscible extract phase of solvent containing predominantly alcohols as the solute. Generally, between about 0.25 volume and about 4 volumes of solvent may be used per volume of the charge mixture which is to be separated. One volume of the solvent to about 2 volumes of the charge mixture constitutes a very satisfactory ratio.

Any suitable technique may be employed for separating the solvent from the alcohols which are extracted thereby; but a preferred embodiment of the present invention contemplates the use of water for selectively extracting the solvent from the alcohols or, stated differently, for throwing the alcohols out of solution in the solvent. After washing the extract phase with water to dissolve out the solvent, the solvent may then be recovered from the water by distillation. It will also be apparent that the small portion of solvent which is dissolved in the raffinate phase can also be recovered by water washing. In lieu of the recovery of the solvent by water extraction, the boiling points of the solvents proposed by the present invention and the alcohols which it will usually be desired to extract with such solvents are sufficiently different to permit the solvent to be separated from these alcohols by ordinary fractional distillation.

The extraction process of the invention can be carried out in a batch, continuous or semicontinuous manner and can be performed in one or more actual stages, employing conventional contacting equipment heretofore utilized in liquid-liquid extraction procedures.

The practice of the present invention can be advantageously implemented in connection with a number of commercial processes for the preparation of higher molecular weight α-olefins and primary alcohols.

Two of such processes for the preparation of the aforesaid substances, and ones in which the present invention has particular applicability, initially involve reacting ethylene with aluminum. These reactants, under conditions well known in the art, will provide a so-called growth product composed of aluminum trialkyls in which the alkyl groups are distributed in accordance with the Poisson formula. Depending upon the amount of ethylene introduced in the reaction system, among other factors, the resultant growth product will contain alkyl substituents peaked at anywhere between about 4 and 30 carbon atoms.

If it is desired to convert a growth product into α-olefins, the hereinbefore-described displacement reaction is practiced. The displacement reaction product is composed of α-olefins, aluminum triethyl and a minor amount of unreacted higher aluminum alkyls. The displacement reaction effluent is next ridded of its aluminum value by any one of three alternate methods, namely, complexing the organo-aluminum compounds with a suitable complexing agent, directly hydrolyzing the effluent, or suitably oxidizing the effluent followed by hydrolysis. When the last of the immediate foregoing recovery procedures is observed; and occasionally in the practice of the others, an α-olefin product is obtained which is minorly, but objectionably, contaminated with primary alcohols substantially incapable of being removed therefrom by fractional distillation methods. Such removal, however, can be readily accomplished in accordance with this invention.

In preparing primary alcohols via the above-described growth process, the resultant growth product is oxidized directly and then hydrolyzed to ultimately yield an alcohol product containing difficultly removable paraffins. As is readily apparent, the instant invention can be employed in this instance to recover a very highly purified alcohol product.

In order to illustrate more clearly to those skilled in the art how the present invention can be carried out, the following working example is presented in which all parts stated are parts by weight. As indicated, this example is given primarily by way of illustration; and accordingly, any enumeration of details contained therein is not to be interpreted as a limitation except as such is expressed in the appended claims.

*Example*

In the initial part of this example, a series of extraction runs in accordance with this invention was conducted. In each run, various mixtures of α-olefins and primary alcohols having similar volatility characteristics were subjected to a single extraction treatment employing the several extracting agents contemplated herein. The extraction procedure observed in each instance consisted of shaking a mixture of olefin, alcohol, and extracting agent thoroughly at ambient room temperature and then permitting phase separation. Upon effecting separation, each phase was analyzed by gas-liquid partition chromatography. The results obtained, together with further details as to the operating conditions observed in each run, are set forth in the following Table I:

TABLE I

RUN 1

| Component | Original Charge, Parts | Solvent Weight, Parts | Bottom Layer, Parts | Top Layer, Parts | Weight Percent Component Removed into Bottom Layer |
|---|---|---|---|---|---|
| 1-tetradecene | 0.8918 | | 0.0396 | 0.8522 | 4.45 |
| 1-dodecanol | 4.5090 | | 1.3786 | 3.1304 | 30.6 |
| 1-hexadecene | 94.5992 | | 5.4778 | 89.1214 | 5.8 |
| Benzyl alcohol | | 50.0000 | 23.6040 | 26.3960 | |
| Total | 100.0000 | 50.0000 | 30.5000 | 119.5000 | |

RUN 2

| 1-tetradecene | 0.8820 | | 0.0000 | 0.8820 | 0 |
| 1-dodecanol | 4.4595 | | 0.9880 | 3.4715 | 22.2 |
| 1-hexadecene | 93.7585 | | 1.1060 | 92.6525 | 1.2 |
| Dimethylformamide | | 25.0000 | 17.9060 | 7.0940 | |
| Total | 99.1000 | 25.0000 | 20.0000 | 104.1000 | |

RUN 3

| 1-tetradecene | 0.8900 | | 0.5480 | 0.3420 | 61.6 |
| 1-dodecanol | 4.5000 | | 0.8814 | 3.6186 | 19.6 |
| 1-hexadecene | 94.6100 | | 0.4758 | 94.1342 | 0.5 |
| Furfuryl alcohol | | 25.0000 | 17.5948 | 7.4052 | |
| Total | 100.0000 | 25.0000 | 19.5000 | 105.5000 | |

RUN 4

| 1-tetradecene | 0.8900 | | 0 | 0.8900 | 0 |
| 1-dodecanol | 4.5000 | | 0.4186 | 4.0814 | 9.3 |
| 1-hexadecene | 94.6100 | | 0.4222 | 94.1878 | 0.4 |
| Furfural | | 25.0000 | 17.3610 | 7.6390 | |
| Total | 100.0000 | 25.0000 | 18.2018 | 106.7982 | |

TABLE I—Continued

RUN 5

| Component | Original Charge, Parts | Solvent Weight, Parts | Bottom Layer, Parts | Top Layer, Parts | Weight Percent Component Removed into Bottom Layer |
|---|---|---|---|---|---|
| 1-octene | 37.7100 | ---------- | 8.0753 | 29.6347 | 21.4 |
| 1-decene | 59.3600 | ---------- | 6.0552 | 53.3048 | 10.2 |
| 1-hexanol | 2.9300 | ---------- | 2.2498 | 0.6802 | 76.8 |
| Dimethylformamide | ---------- | 52.0000 | 35.8195 | 16.1805 | ---------- |
| Total | 100.0000 | 52.0000 | 52.1998 | 99.8002 | ---------- |

RUN 6

| 1-hexadecene | 60.8200 | ---------- | 3.4828 | 57.3372 | 5.7 |
| 1-octadecene | 35.5100 | ---------- | 1.7141 | 33.7959 | 4.8 |
| 1-hexadecanol | 3.6600 | ---------- | 1.1245 | 2.5355 | 30.7 |
| Benzyl alcohol | ---------- | 50.0000 | 32.7236 | 17.2864 | ---------- |
| Total | 100.0000 | 50.0000 | 39.0450 | 110.9550 | ---------- |

RUN 7

| 1-hexadecene | 60.8200 | ---------- | 0.5447 | 60.2753 | 0.9 |
| 1-octadecene | 35.5100 | ---------- | 0.2118 | 35.2982 | 0.6 |
| 1-hexadecanol | 3.6600 | ---------- | 0.3845 | 3.2755 | 10.5 |
| Dimethylformamide | ---------- | 25.0000 | 16.6590 | 8.3410 | ---------- |
| Total | 100.0000 | 25.0000 | 17.8000 | 107.2000 | ---------- |

As has hereinbefore been indicated, the solvents used to extract the normal primary alcohols from the α-olefin and normal paraffinic hydrocarbons can be recovered from the alcohols in the extract phase by dissolution of the alcohols resulting from the addition of water to the extract phase. To show the effect of such water addition to the extract phase, 19.4 parts of the bottom layer of the dimethylformamide extraction set forth as run 2 in Table I above were mixed with 4.0 parts of water. This mixture was shaken for about 5 minutes at ambient room temperature; after which, upon standing quiescently, the mixture stratified into two layers. These layers were separated and analyzed, and the results of the analysis are reported in Table II below.

TABLE II

| Component | Charge, Parts | Solvent | Top Layer, Parts | Bottom Layer, Parts |
|---|---|---|---|---|
| 1-tetradecene | 0.0000 | ---------- | 0.0000 | 0.0000 |
| 1-dodecanol | 0.9584 | ---------- | 0.9584 | 0.0000 |
| 1-hexadecene | 1.0728 | ---------- | 1.0728 | 0.0000 |
| Dimethylformamide | 17.3688 | ---------- | 0.7053 | 16.6635 |
| Water | ---------- | 4.0000 | 0.2635 | 3.7365 |
| Total | 19.4000 | 4.0000 | 3.0000 | 20.4000 |

What is claimed is:

1. A method for separating water-insoluble, normal primary alkanols from a solution thereof in hydrocarbons having substantially the same volatility characteristics as the alkanols which comprise solvent extracting said solution with an agent selected from the group consisting of benzyl alcohol, dimethylformamide, furfuryl alcohol, furfural and mixtures thereof.

2. A method in accordance with claim 1 wherein said hydrocarbons are selected from the group consisting of α-olefins, straight chain paraffins and mixtures thereof.

3. A method in accordance with claim 2 wherein said primary alkanol has a carbon atom length between about 8 and 40.

4. A method in accordance with claim 3 wherein the volumetric ratio of said solvent to said solution is from about 0.25 to 4.

5. A method in accordance with claim 4 wherein said solvent is benzyl alcohol.

6. A method in accordance with claim 4 wherein said solvent is dimethylformamide.

7. A method in accordance with claim 4 wherein said solvent is furfuryl alcohol.

8. A method in accordance with claim 4 wherein said solvent is furfural.

9. In a method for the manufacture of α-olefins wherein aluminum is initially reacted with ethylene to produce a growth product which is then reacted with ethylene in either a thermal or catalytic displacement reaction to provide an α-olefin effluent from whence the aluminum content is removed, the improvement of solvent extracting said aluminum-free effluent with an agent selected from the group consisting of benzyl alcohol, dimethylformamide, furfuryl alcohol, furfural and mixtures thereof and recovering from the raffinate phase the α-olefin content thereof.

No references cited.

LEON ZITVER, *Primary Examiner.*

J. E. EVANS, *Assistant Examiner.*